(12) United States Patent
Chang et al.

(10) Patent No.: US 8,614,549 B2
(45) Date of Patent: Dec. 24, 2013

(54) EMERGENCY ILLUMINATION SYSTEM BASED ON LED COMBINED LED LAMPS

(76) Inventors: Baoyan Chang, Wuxi (CN); Zijun Chen, Wuxi (CN); Kari Zhuang, Wuxi (CN); Zhenqiu Li, Wuxi (CN); Lei Dong, Wuxi (CN)

( * ) Notice: Subject to any disclaimer, the term of this patent is extended or adjusted under 35 U.S.C. 154(b) by 169 days.

(21) Appl. No.: 13/341,917

(22) Filed: Dec. 31, 2011

(65) Prior Publication Data

US 2013/0049590 A1    Feb. 28, 2013

(30) Foreign Application Priority Data

Aug. 29, 2011    (CN) .......................... 2011 1 0251126

(51) Int. Cl.
*H05B 37/00*    (2006.01)
(52) U.S. Cl.
USPC .......................................... 315/160; 315/161
(58) Field of Classification Search
USPC ......... 315/127, 120, 125, 129, 160, 161, 162, 315/163, 164, 165, 166, 174, 175
See application file for complete search history.

(56) References Cited

U.S. PATENT DOCUMENTS

| 7,638,948 | B2 * | 12/2009 | Descarries et al. | 315/86 |
| 7,915,829 | B2 * | 3/2011 | Keller et al. | 315/86 |
| 2003/0141819 | A1 * | 7/2003 | Cojocary | 315/86 |

* cited by examiner

*Primary Examiner* — Minh D A
(74) *Attorney, Agent, or Firm* — George D. Liu; Ronda IP Agent Co., Ltd

(57) ABSTRACT

The present invention is providing an emergency illumination system based on combined LED lamps, comprising: combined LED lamps, a power driver of the lamps, an electromagnetic sensors, an emergency controller, a storage battery and an emergency charger; said external power supply, electromagnetic sensors, power driver of the lamps and conventional illumination LED lamps are in turn connected to form a conventional illumination load circuit; said external power supply, electromagnetic sensors, emergency charger, storage battery are in turn connected to form an emergency illumination charging circuit; magnetic catheter in said electromagnetic sensors serving as a start switch connects with said emergency controller; said emergency controller connects to the storage battery and emergency illumination LED lamps respectively thereby forming an emergency illumination load circuit; It is an uninterrupted illumination system, which comprise a dual-use lamp consisting of conventional illumination, and emergency illumination.

6 Claims, 3 Drawing Sheets

EMERGENCY ILLUMINATION SYSTEM BASED ON LED COMBINED LED LAMPS

CROSS-REFERENCE TO RELATED APPLICATIONS

The present application claims the benefits of priority of the Chinese Patent Application Number 201110251126.2, filed on Aug. 29, 2011. The entire content of the application is incorporated herein by reference.

BACKGROUND OF THE PRESENT INVENTION

1. Field of the Present Invention

The present invention relates to LED illumination technology, and more especially to an emergency illumination system based on combined LED lamps.

2. Description of the Prior Art

The existing emergency lamps just have one-use function, its volume is large, it consumes a lot of power, unable to control itself, and its life is short.

There are no dual-use lamps to solve these technical issues above, which can be used in explosion proof and the harsh environment while its volume is one third of the existing emergency lamps. Otherwise, it can be integrated by high system, and most components of it are low energy component, and it uses LED as illumination, so as to save more than 50% energy.

It also needs the ability of strong control, automatic control for AC-DC converting, charging voltage current control, over-discharge voltage and current control, overheating protection, protection from thunder, short circuit protection and so on. It should ensure that the service life of it is more than five years.

BRIEF SUMMARY OF THE PRESENT INVENTION

In order to solve the said problem and meet the actual needs, the present invention providing an emergency illumination system based on combined LED lamps. The system mainly used in some work place which need special illumination condition, such as financial and business. It is an uninterrupted illumination system, which comprise a dual-use lamp consisting of conventional illumination and emergency illumination.

The detailed technical solutions of the present invention as follows:

An emergency illumination system based on combined LED lamps, comprising:

combined LED lamps, a power driver of the lamps, an electromagnetic sensors having a built-in magnetic catheter, an emergency controller, a storage battery and an emergency charger;

said combined LED lamps consist of conventional illumination LED lamps and emergency illumination LED lamps;

said external power supply, electromagnetic sensors, power driver of the lamps and conventional illumination LED lamps are in turn connected to form a conventional illumination load circuit;

said external power supply, electromagnetic sensors, emergency charger, storage battery are in turn connected to form an emergency illumination charging circuit;

said magnetic catheter in said electromagnetic sensors serving as a start switch connects with said emergency controller; said emergency controller connects to the storage battery and emergency illumination LED lamps respectively thereby forming an emergency illumination load circuit;

when the external power supply works consecutively, the electromagnetic sensors is on-state, and the conventional illumination LED lamps work normally, while the external power supply charges the storage battery by the emergency charger; due to the current magnetic field in the circuit of the electromagnetic sensors, the magnetic catheter is open-circuit state, the emergency controller is unable to control the storage battery to supply power to the emergency illumination LED lamps and is either unable to ensure the illumination load circuit in normal operation accordingly;

when the external power supply is powered off, the electromagnetic sensors is open-circuit state, and the conventional illumination LED lamps is turned off, while the external power supply is unable to charge the storage battery by the emergency charger; due to the disappearance of the current magnetic field in the circuit of the electromagnetic sensors, the magnetic catheter is short-circuit state, therefore the emergency controller controls the storage battery to supply power to the emergency illumination LED lamps to ensure the illumination load circuit in normal operation.

As above-mentioned, said combined LED combination lamps comprise a plurality of illumination lamps consisting of two kinds of LED lamps which have different power, LED lamps having larger power are conventional illumination LED lamps and LED lamps having smaller power are emergency illumination LED lamps.

As above-mentioned, said conventional illumination LED lamps and the emergency illumination LED lamps are placed in a plane, and the number of said conventional illumination LED lamps is no less than the number of said emergency illumination LED lamps in the whole combined LED lamps.

As above-mentioned, said power driver of the lamps comprise thermal protection module, surge protection module, over-current protection module, EMI filter module, full-bridge rectifier module, passive power factor correction module, start voltage module, constant current source compensation module, PWM control module, source driver circuit and source driver module.

As above-mentioned, the emergency controller outputs a constant current and voltage to the emergency LED illumination lamps via an emergency power controller.

The present invention providing an emergency illumination system, which providing a dual-use lamp by a simple automatic control system structure of photoelectric conversion. It comprises both conventional illumination system and emergency illumination system. When the public electricity is power-off, the emergency illumination system converts to emergency illumination automatically, when the public electricity is power-on, the emergency illumination system converts to conventional illumination automatically, the converting time is less than one second, so it is adapted to such situation that people are unwilling to suffer from loss of light for the failure of power supply and hope to light when no need of illumination.

BRIEF DESCRIPTION OF THE DRAWINGS

The present invention will be illustrated by the following combination of figure and specific implementation.

DETAILED DESCRIPTION OF THE PRESENT INVENTION

In order to understand the techniques, invention features, objective and functional effects of the resent invention easily, the resent invention will be illustrated with figures.

Figure 1A:
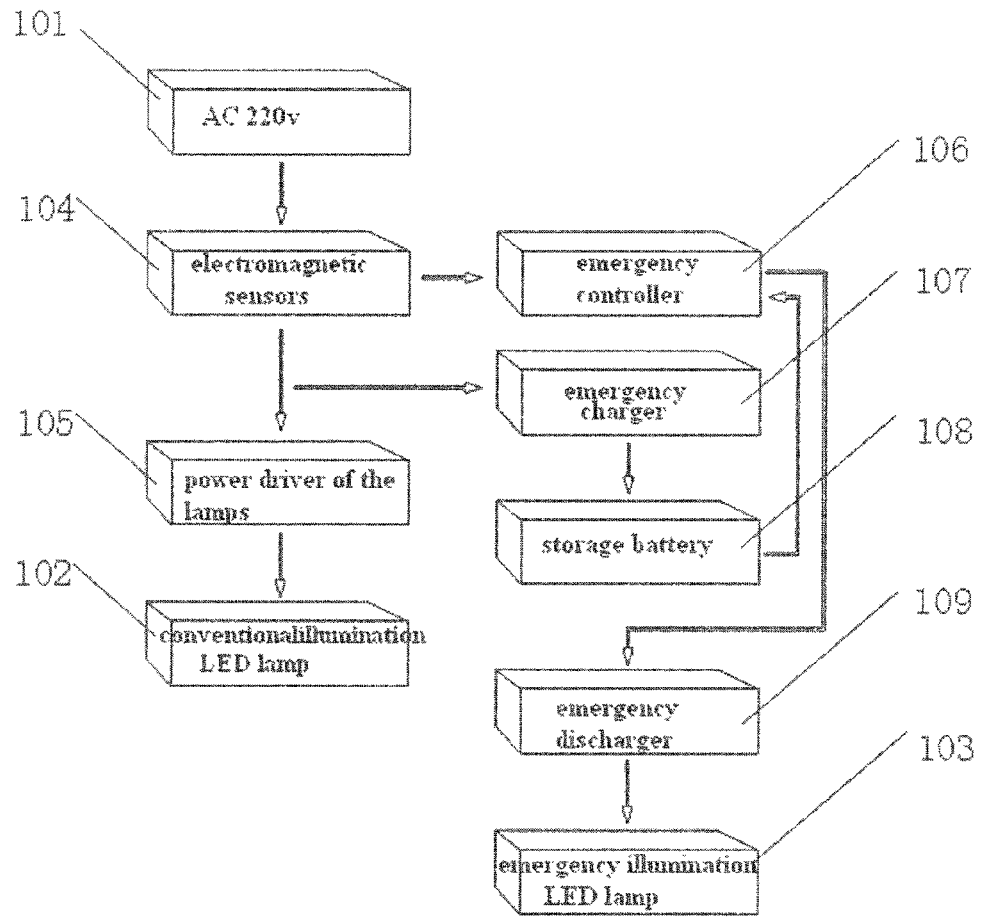
FIG. 1a is a structure block diagram illustrating the illumination system.
Figure 1B:
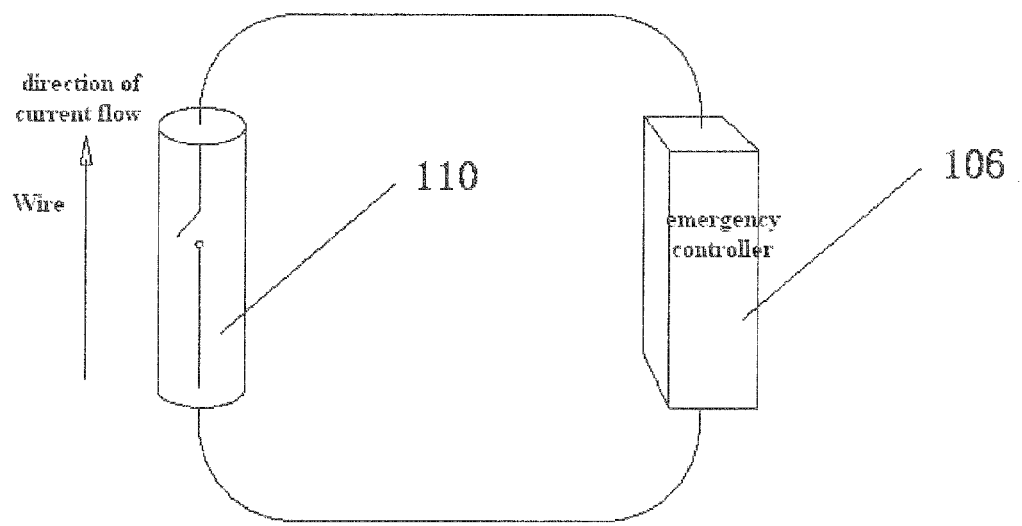
FIG. 1b is a structure principle diagram illustrating the emergency controller connects to the magnetic catheter which is built in electromagnetic sensors.

As it shown in the FIG. 1a and FIG. 1b, the emergency illumination system based on combined LED lamps of the resent invention comprising a combined LED lamps consist of conventional illumination LED lamps (102) and emergency illumination LED lamps (103), a power driver of the lamps (105), an electromagnetic sensors (104) having a built-in magnetic catheter (110), an emergency controller (106), a storage battery (108) and an emergency charger (107). There sets three operation circuits between the entire illumination system and the external power supply (101) (220v AC power).

Firstly, the external power supply (101), electromagnetic sensors (104), power driver of the lamps (105) and conventional illumination LED lamps (102) are in turn connected to form a conventional illumination load circuit.

Secondly, the external power supply (101), electromagnetic sensors (104), emergency charger (107), storage battery (108) are in turn to form an emergency illumination emergency illumination charging circuit.

Otherwise, the magnetic catheter (110) in said electromagnetic sensors (104) serving as a start switch connects with the emergency controller (106); the emergency controller (106) connects to the storage battery (108) and emergency illumination LED lamps (103) respectively, thereby forming an emergency illumination load circuit. In order to achieve the best results, there sets a emergency discharger (109) between the emergency controller (106) and the emergency illumination LED lamps (103).

When the external power supply (101) works consecutively, the electromagnetic sensors (104) is on-state, and the conventional illumination LED lamps (102) works normally, while the external power supply (101) charges the storage battery (108) by the emergency charger (107); due to the current magnetic field in the circuit of the electromagnetic sensors (104), the magnetic catheter (110) is open-circuit state, the emergency controller (106) is unable to control the storage battery (108) to supply power to the emergency illumination LED lamps (103) and is either unable to ensure the illumination load circuit in normal operation accordingly;

When the said external power supply (101) is powered-off, the electromagnetic sensors (104) is open-circuit, and the conventional illumination LED lamps (102) are turned off, while the external power supply (101) is unable to charge the storage battery (108) by the emergency charger (107); due to the disappearance of the current magnetic field in the circuit of the electromagnetic sensors (104), the magnetic catheter (110) is short-circuit state, therefore the emergency controller (106) control the storage battery (108) to supply power to the emergency illumination LED lamps (103) to ensure the illumination load circuit in normal operation.

Figure 2A:
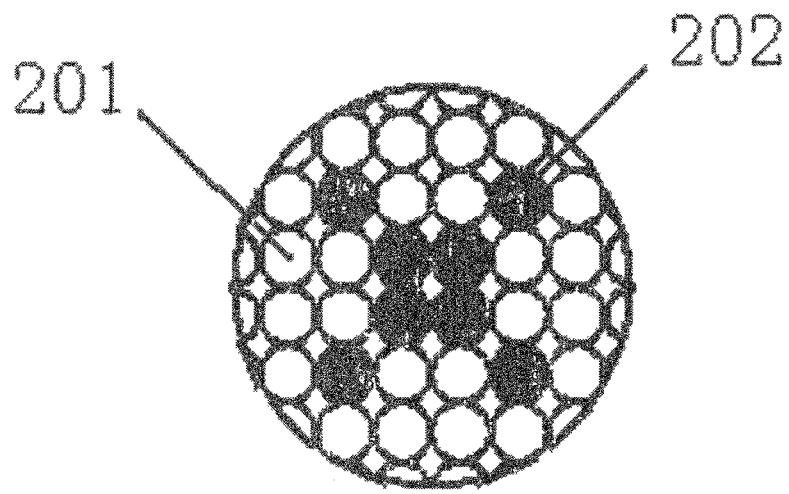
FIG. 2a is a structure diagram illustrating the conventional illumination state of the LED combination lamps of the illumination.
Figure 2B:
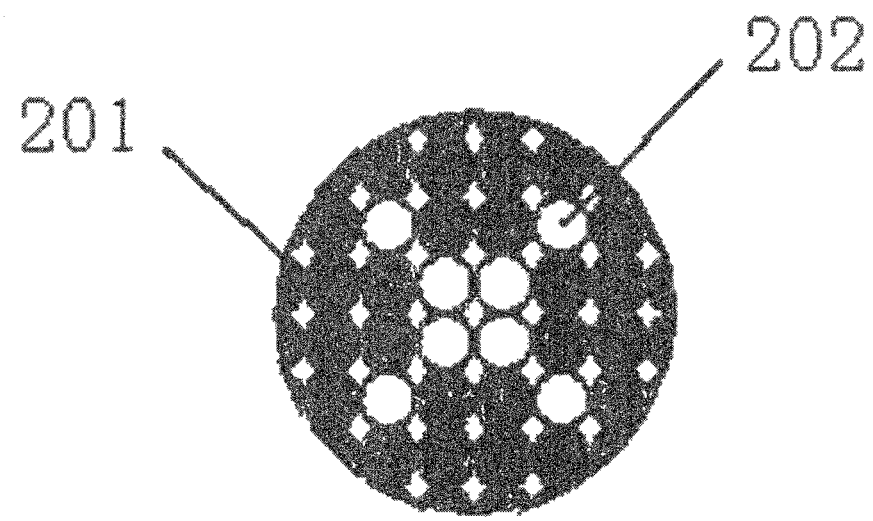
FIG. 2b is a structure diagram illustrating the emergency illumination state of the illumination system's LED combination lamps.

As it shown in the FIG. 2a and FIG. 2b, the combined LED lamps comprise a plurality of illumination lamps consisting of two kinds of LED lamps which have different power, LED lamps having larger power are conventional illumination LED lamps and LED lamps having smaller power are emergency illumination LED lamps. Certainly, the conventional illumination LED lamps and the emergency illumination LED lamps are placed in a plane, and the number of the conventional illumination LED lamps is not less than the number of the emergency illumination LED lamps in the whole combined LED lamps.

Figure 3:
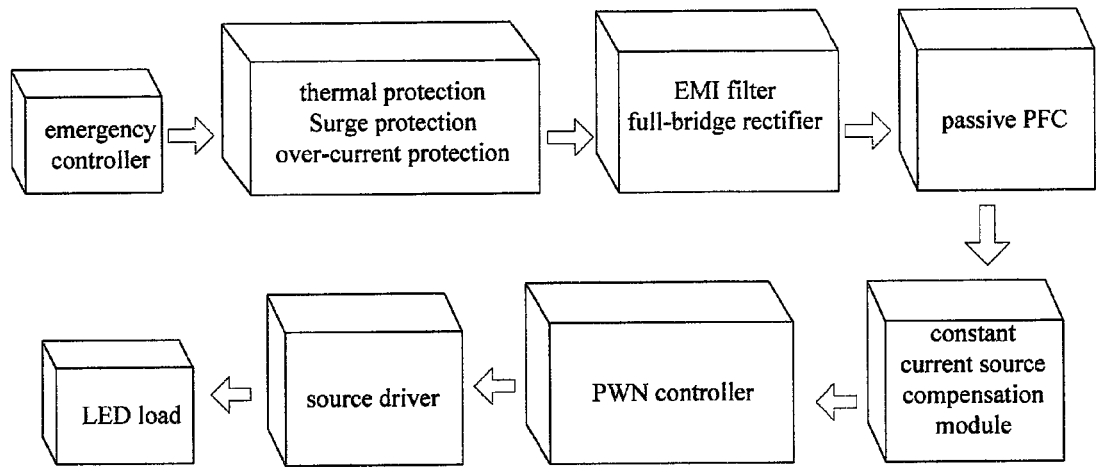
FIG. 3 is an application diagram illustrating the power driver of the lamps of the illumination system.

As it shown in the FIG. 3, the power driver of the lamps connects to the 220v AC power and the LED load conventional illumination LED lamps) respectively to supply DC current and voltage stability to the conventional illumination LED lamps. The power driver of the lamps comprising thermal protection module, surge protection module, over-current protection module, EMI filter module, full-bridge rectifier module, passive power factor correction module, tart voltage module, constant current source compensation module, PWM control module, source driver circuit and source driver module.

Figure 4:
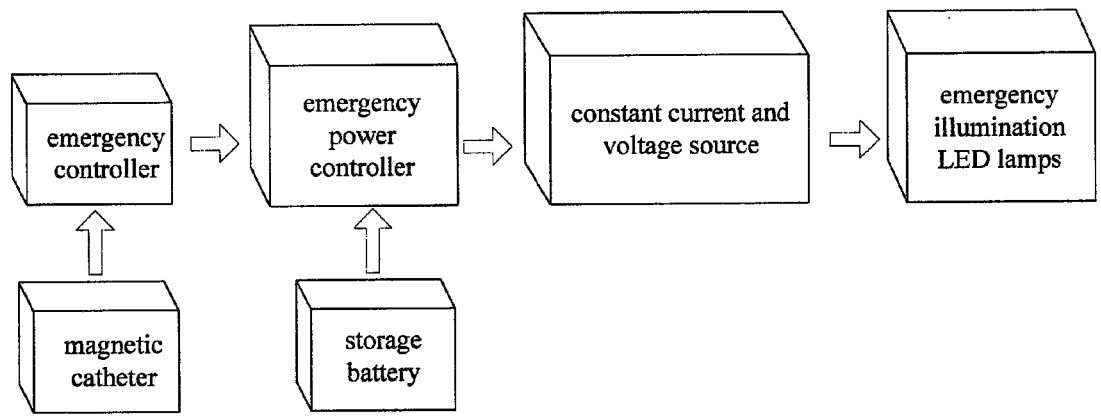
FIG. 4 is an application diagram illustrating the emergency controller of the illumination system.

As it shown in the FIG. 4, emergency controller used to supply constant current and constant voltage to the emergency illumination LED lamps. Specifically, the emergency controller outputs a constant current and voltage to the emergency LED illumination lamps via an emergency power controller.

Figure 5:
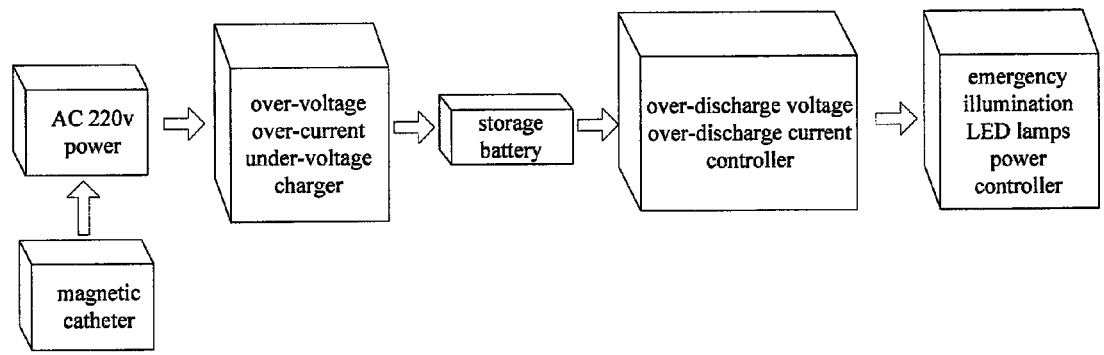
FIG. 5 is a work principle diagram illustrating the electrical charge and discharge of the emergency illumination LED lamps of the illumination system.

As it shown in the FIG. 5, the workflow of the emergency charging part of the present invention is: when inputting 220v AC power to the system, the emergency charger charges the storage battery. When the voltage value of the storage battery achieves a rated voltage or the voltage value is larger than a rated voltage, the charger stops charging automatically. E.g., when the storage battery is short-circuit, or the outside circuit of the storage battery is short-circuit. When the voltage value of the storage battery is lower than a rated voltage, the charger also stops charging automatically. When the 220v AC power is cut-off, the storage battery stops being charged, and supplies power to the emergency power controller. When the controller detected the voltage value of the storage battery is lower than a rated voltage, the storage battery stops supplying power to the load. When the controller detected the voltage value of the storage battery is larger than a rated voltage, the storage battery stops supplying power to the load. So the system has the functions of over-voltage protection, over-current protection, under-voltage protection, under-current protection. It protects both the load and the storage battery.

The above-mentioned illustrated the fundamentals, main features and advantages of the present invention. The present invention may be realized, the invention is not restricted by the embodiments.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. An emergency illumination system based on combined LED lamps, comprising:

combined LED lamps, a power driver of the lamps, an electromagnetic sensors having a built-in magnetic catheter, an emergency controller, a storage battery and an emergency charger;

which is characterized in that:

said combined LED lamps consist of conventional illumination LED lamps and emergency illumination LED lamps;

said external power supply, electromagnetic sensors, power driver of the lamps and conventional illumination LED lamps are in turn connected to form a conventional illumination load circuit;

said external power supply, electromagnetic sensors, emergency charger, storage battery are in turn connected to form an emergency illumination charging circuit;

said magnetic catheter in said electromagnetic sensors serving as a start switch connects with said emergency controller; said emergency controller connects to the storage battery and emergency illumination LED lamps respectively thereby forming an emergency illumination load circuit;

when the external power supply works consecutively, the electromagnetic sensors is on-state, and the conventional illumination LED lamps work normally, while the external power supply charges the storage battery by the emergency charger; due to the current magnetic field in the circuit of the electromagnetic sensors, the magnetic catheter is open-circuit state, the emergency controller is unable to control the storage battery to supply power to the emergency illumination LED lamps and is either unable to ensure the illumination load circuit in normal operation accordingly;

when the external power supply is powered off, the electromagnetic sensors is open-circuit state, and the conventional illumination LED lamps is turned off, while the external power supply is unable to charge the storage battery by the emergency charger; due to the disappearance of the current magnetic field in the circuit of the electromagnetic sensors, the magnetic catheter is short-circuit state, therefore the emergency controller controls the storage battery to supply power to the emergency illumination LED lamps to ensure the illumination load circuit in normal operation.

2. The system as claimed in claim 1, wherein said combined LED combination lamps comprise a plurality of illumination lamps consisting of two kinds of LED lamps which have different power, LED lamps having larger power are conventional illumination LED lamps and LED lamps having smaller power are emergency illumination LED lamps.

3. The system as claimed in claim 2, wherein said conventional illumination LED lamps and the emergency illumination LED lamps are placed in a plane, and the number of said conventional illumination. LED lamps is no less than the number of said emergency illumination LED lamps in the whole combined LED lamps.

4. The system as claimed in claim 1, wherein said power driver of the lamps comprise thermal protection module, surge protection module, over-current protection module, EMI filter module, full-bridge rectifier module, passive power factor correction module, start voltage module constant current source compensation module, PWM control module, source driver circuit and source driver module.

5. The system as claimed in claim 1, wherein said emergency controller outputs a constant current and voltage to the emergency LED illumination lamps via an emergency power controller.

6. The system as claimed in claim 1, wherein said external power supply is 220v AC power.

* * * * *